United States Patent Office 3,252,893
Patented May 24, 1966

3,252,893
PURIFICATION OF MINERAL OILS CONTAMI-
NATED WITH CATALYST PARTICLES
Ivor W. Mills, Glenolden, Pa., assignor to Sun Oil Company, Philadelphia, Pa., a corporation of New York
No Drawing. Filed July 3, 1963, Ser. No. 292,775
6 Claims. (Cl. 208—251)

This invention relates to the removal of molybdenum sulfide or molybdenum sulfide-cobalt sulfide catalyst particles from mineral oils by washing the oil with ammonium hydroxide.

It is well known in the art to catalytically hydrogenate mineral oil in order to improve the properties of the oil for its intended application. Such hydrogenation is conventionally referred to as hydrofining. For example, gasoline and lubricating oils are hydrogenated in order to remove corrosive sulfur compounds and/or to reduce their sludge forming tendencies. Similarly electrical oils such as transformer and insulating oils are hydrogenated not only to reduce their sludge forming tendencies but also to improve specific electrical properties such as dissipation factor. The hydrogenation is conventionally carried out at a temperature in the range of 300° to 700° F., a pressure in the range of 50–800 p.s.i.g., a liquid hourly space velocity in the range of 0.1 to 10.0 volumes of oil per hour per volume of catalyst, in the presence of hydrogen and in the presence of a catalyst. The catalyst usually employed is either molybdenum sulfide or a mixture of cobalt sulfide and molybdenum sulfide, either being deposited on an inert carrier such as silica, alumina, kieselguhr, etc., with alumina being the preferred inert carrier. Whether the catalyst is molybdenum sulfide or cobalt sulfide-molybdenum sulfide it can be pre-formed, by known techniques, prior to contact with the mineral oil but is sometimes formed during contact of the oil with the catalyst. In this latter case the catalyst initially contacted with the oil contains oxides of cobalt and molybdenum, or molybdenum oxide as the case may be, rather than sulfides, but tre sulfur naturally present in the oil being treated rapidly converts the oxides to the sulfides. In any event the active component of the catalyst is either molybdenum sulfide or a cobalt sulfide-molybdenum sulfide mixture. A catalyst containing molybdenum sulfide, either with or without added cobalt sulfide, deposited on an inert support is referred to hereinafter as a molybdenum sulfide catalyst. The amount of molybdenum in such a catalyst is normally in the range of 3–10% and where the catalyst also contains cobalt sulfide the amount of the latter is normally in the range of 1–6%. The hydrogenation is in most cases a liquid phase operation and is normally effected by passing the mineral oil through a fixed bed of catalyst or by slurrying the catalyst in the mineral oil and subsequently separating the catalyst.

A problem associated with hydrogenation of mineral oils as described above is that the hydrogenated oil occasionally contains small catalyst particles suspended therein which adversely affect the quality of the oil. This contamination sometimes occurs whether the catalytic material is molybdenum sulfide or molybdenum sulfide-cobalt sulfide. The nature of the deleterious effect on oil quality depends on the intended use of the oil. In a lubricating oil the catalyst particles render the oil more abrasive; in an electrical oil the catalyst particles increase the dissipation factor of the oil. Other undesirable effects are observed in other types of mineral oils.

The suspended molybdenum sulfide catalyst particles are small (mainly 0.05–100.0 microns) and difficult to remove. Filtering the oil through activated clay, a conventional petroleum refining technique, effects substantially no removal of the particles. Some, but not all, of the particles can usually be removed by filtering the oil through a filter having a porosity of 0.45 micron; but even if all the particles could be removed by this procedure, the procedure would be impractical on a commercial scale because the low porosity results in an extremely low oil filtration rate. Treating the oil with sulfuric acid followed by clay treatment, another well known petroleum refining procedure, does not remove the catalyst particles from the oil.

I have now found that these finely divided catalyst particles can be removed from the oil by washing the oil with ammonium hydroxide.

The term washing is used herein in its conventional petroleum refining meaning, i.e., the oil to be washed is contacted, i.e., intimately mixed, with the ammonium hydroxide, which is immiscible with the oil, and the ammonium hydroxide is then separated from the oil. The resulting oil is washed oil. The oil to be washed, for the present purpose, is a mineral oil containing molybdenum sulfide catalyst particles suspended therein.

The strength of the ammonium hydroxide can vary over relatively wide ranges but is preferably at least 0.5%. If desired, higher strengths up to saturation can also be employed. As used herein the strength of the washing agent is by weight and refers to the ammonia content of the ammonium hydroxide. The volume of ammonium hydroxide can also vary widely but is preferably such that when the ammonium hydroxide is mixed with the oil two distinct phases result. Normally the amount of ammonium hydroxide will be 0.05–1.0 volume of ammonium hydroxide per volume of oil.

The temperature at which the washing is carried out can vary considerably. Washing at room temperature generally provides satisfactory results, although if a relatively viscous mineral oil is being washed, intimate mixing of the oil and ammonium hydroxide is facilitated by heating the oil to a higher temperature in order to reduce its viscosity.

The washing can be carried out in conventional equipment. For example, the oil containing molybdenum sulfide catalyst particles suspended therein is charged to a tank equipped with an agitator. Ammonium hydroxide having a strength of, say, 5% is then charged to the tank in an amount of, say, 0.1 volume ammonium hydroxide per volume of oil. The contents of the tank are then agitated so as to intimately contact the oil with the ammonium hydroxide. The time required to effect such intimate contact will vary depending upon the quantity of materials being mixed, the type of agitator, etc. but will usually be on the order of 2–20 minutes. After the oil and ammonium hydroxide have been intimately mixed, the agitation is stopped and the mixture is allowed to settle. Two layers result, an upper layer of oil and a lower aqueous layer. The oil layer is refined oil, i.e., it is essentially free of suspended molybdenum sulfide catalyst particles. The aqueous layer is essentially all of the ammonium hydroxide used and contains essentially all of the molybdenum sulfide catalyst originally present in the oil. Refined oil is recovered from the two layer system by, for example, decanting the oil layer or by draining the heavier aqueous layer from the bottom of the tank.

The washed, i.e., recovered oil is, as described, refined oil in that it is essentially free of the molybdenum sulfide catalyst particles originally present in the oil. The washed oil may, however, contain traces of ammonium hydroxide and in some cases, such as in an electrical oil where the presence of water increases the dissipation factor of the oil, it will be desirable to remove this residual ammonium hydroxide. This removal can be effected in any of several convenient methods. The preferred method is to treat the oil with an acid type adsorptive clay such as fuller's earth. Clay treating is well known in the art and involves either passing the oil through a bed of clay (percolation method) or slurrying the clay in the oil and then separating the clay by filtration (contact method). In either case the amount of clay employed is usually 1–40 lbs. per barrel of oil. It should be noted that clay treating of the recovered oil removes not only any residual water present in the oil but also any ammonia. As an alternative to clay treating the washed oil can be blown with air, nitrogen, etc. This technique, which is also a well known method for removing water from oil, i.e., for drying the oil, will also remove any ammonia present in the oil.

The following examples illustrate the invention more specifically.

*Example I*

The starting oil is a mineral oil suitable for use as an insulating oil. It has the following properties: A.P.I. gravity—22.6, viscosity at 100° F.—720 S.U.S., viscosity at 210° F.—597 S.U.S., viscosity index—14, flash point—405° F., fire point—450° F., pour point——10° F., acidity—0.

A portion of the above oil is hydrofined by contacting the oil with a cobalt sulfide-molybdenum sulfide on alumina catalyst under the following conditions: pressure—500 p.s.i.g., temeprature—550° F., liquid hourly space velocity—1, hydrogen consumption—10 std. ft.$^3$ per bbl. of oil. The hydro-treated oil is then treated with 5 lbs. fuller's earth per bbl. of oil. The finished oil has initial and aged dissipation factors of 0.0002 and 0.05 respectively. The initial dissipation factor is the dissipation factor of the finshed oil "as is," while the aged dissipation factor is the dissipation factor after the finished oil has been treated as outlined in ASTM D—1934 Procedure B. This procedure involves heating the oil at 115° C. for 96 hours in the presence of copper and in an atmosphere of moving air. An indication of the stability of the oil under normal use conditions can be obtained by comparing the initial and aged dissipation factors of the oil. Preferably the aged dissipation factor is not higher than the initial dissipation factor, although most insulating oils will show some increase. The results obtained on the finished oil of Example I are satisfactory, i.e., the finished oil is a commercially acceptable insulating oil.

*Example II*

Another portion of the starting oil of Example I is hydrofined under apparently the same conditions as in Example I. The hydrofined oil is then clay treated in the manner described in Example I. The finished oil has initial and aged dissipation factors of 0.0020 and 0.36 respectively, these values clearly being substantially higher than the corresponding values in Example I. Tests for cobalt and molybdenum in the oil are positive. A sample of this contaminated oil is filtered through filter paper having a porosity of 0.47 micron, i.e., the paper will pass particles having a size less than 0.47 micron and will retain larger size particles. A light pink material which tests positive for cobalt and molybdenum is retained on the filter paper but the filtrate oil still tests positive for cobalt and molybdenum.

Another sample of the contaminated oil is mixed with 0.1 volume of 5% $NH_4OH$ per volume of oil. The washed oil is separated and is tested for cobalt and molybdenum. Both tests are negative. The washed oil is then treated with 5 lbs. fuller's earth per barrel of oil to yield a finished oil which has initial and aged dissipation factors of 0.0002 and 0.06, again substantially the same as in Example I when no catalyst contamination occurred.

Substantially the same results are obtained when other mineral oils contaminated with molybdenum sulfide or molybdenum sulfide-cobalt sulfide catalyst particles are treated in the manner specified herein.

The invention claimed is:

1. Method which comprises (1) contacting a mineral oil contaminated with molybdenum sulfide catalyst particles with ammonium hydroxide, (2) settling the resulting mixture whereby there is formed a two layer system containing a lower aqueous layer and an upper refined oil layer, and (3) separating refined oil from said two layer system.

2. Method according to claim 1 wherein the strength of said ammonium hydroxide is at least 0.5%.

3. Method according to claim 1 wherein the separated oil is thereafter treated to remove residual ammonium hydroxide.

4. Method of purifying a mineral oil contaminated with molybdenum sulfide catalyst particles which comprises washing said oil with ammonium hydroxide.

5. Method according to claim 4 wherein the strength of said ammonium hydroxide is at least 0.5%.

6. Method according to claim 4 wherein the washed oil is thereafter treated to remove residual ammonium hydroxide.

References Cited by the Examiner
UNITED STATES PATENTS

| | | | |
|---|---|---|---|
| 3,039,957 | 6/1962 | Robbins et al. | 208—212 |
| 3,121,678 | 2/1964 | Behymer et al. | 208—212 |
| 3,128,155 | 4/1964 | Mattox | 208—212 |
| 3,152,070 | 10/1964 | Lehmann et al. | 208—212 |

DELBERT E. GANTZ, *Primary Examiner.*

ALPHONSO D. SULLIVAN, *Examiner.*

S. P. JONES, *Assistant Examiner.*